US009179258B1

(12) United States Patent
Siegel et al.

(10) Patent No.: US 9,179,258 B1
(45) Date of Patent: Nov. 3, 2015

(54) LOCATION BASED RECOMMENDATIONS

(75) Inventors: Hilliard Bruce Siegel, Seattle, WA (US); Michael M. George, Mercer Island, WA (US)

(73) Assignee: Amazon Technologies, Inc., Reno, NV (US)

( * ) Notice: Subject to any disclaimer, the term of this patent is extended or adjusted under 35 U.S.C. 154(b) by 98 days.

(21) Appl. No.: 13/423,878

(22) Filed: Mar. 19, 2012

(51) Int. Cl.
*H04W 4/02* (2009.01)
*G06Q 50/00* (2012.01)

(52) U.S. Cl.
CPC ............... *H04W 4/023* (2013.01); *G06Q 50/01* (2013.01); *H04W 4/028* (2013.01)

(58) Field of Classification Search
USPC ................ 455/456.3; 705/26.7, 319; 709/204
See application file for complete search history.

(56) References Cited

U.S. PATENT DOCUMENTS

| | | | |
|---|---|---|---|
| 6,269,343 B1 | 7/2001 | Pallakoff | |
| 7,668,747 B2 | 2/2010 | Murphy et al. | |
| 7,672,897 B2 | 3/2010 | Chung et al. | |
| 8,135,505 B2 * | 3/2012 | Vengroff et al. | 701/24 |
| 8,725,569 B2 * | 5/2014 | Liang et al. | 705/14.66 |
| 8,756,011 B2 * | 6/2014 | Vengroff et al. | 701/521 |
| 2003/0063072 A1 * | 4/2003 | Brandenberg et al. | 345/173 |
| 2007/0030824 A1 * | 2/2007 | Ribaudo et al. | 370/328 |
| 2007/0287473 A1 * | 12/2007 | Dupray | 455/456.1 |
| 2008/0140640 A1 * | 6/2008 | Raff | 707/5 |
| 2009/0005987 A1 * | 1/2009 | Vengroff et al. | 701/300 |
| 2009/0319288 A1 * | 12/2009 | Slaney et al. | 705/1 |
| 2010/0111372 A1 * | 5/2010 | Zheng et al. | 382/113 |
| 2010/0317392 A1 * | 12/2010 | Davis et al. | 455/518 |
| 2011/0070863 A1 * | 3/2011 | Ma et al. | 455/410 |
| 2011/0126119 A1 * | 5/2011 | Young et al. | 715/744 |
| 2011/0191352 A1 * | 8/2011 | Jones et al. | 707/749 |
| 2011/0208617 A1 * | 8/2011 | Weiland | 705/27.1 |
| 2012/0100867 A1 * | 4/2012 | Liang et al. | 455/456.1 |
| 2012/0100869 A1 * | 4/2012 | Liang et al. | 455/456.1 |
| 2013/0097246 A1 * | 4/2013 | Zifroni et al. | 709/204 |
| 2014/0031073 A1 * | 1/2014 | Davis et al. | 455/518 |

OTHER PUBLICATIONS

Greg Linden et al., "Amazon.com Recommendations, Item-to-Item Collaborative Filtering", Jan. • Feb. 2003,IEEE Internet Computing, pp. 76-80.*

Quentin Jones et al., "P3 Systems, Putting the Place Back into Social Networks", Sep. • Oct. 2005, IEEE Internet Computing, pp. 38-46.*

(Continued)

*Primary Examiner* — Jason K. Gee
*Assistant Examiner* — Zhimei Zhu
(74) *Attorney, Agent, or Firm* — Lee & Hayes, PLLC

(57) ABSTRACT

Location data that corresponds to one or more user devices each associated with a user may be obtained. Based on the location data, the particular location of a user may be determined. Similarities between various users may be identified when it is determined that those users have visited the same locations. Upon at least two users visiting a threshold amount of the same locations, one or more recommendations may be provided to the users, whereby the recommendations relate to places that those users have yet to visit. In addition, the users may have the opportunity to reveal information about themselves to other users, while maintaining their anonymity. As a result, the users may meet people and learn about new places that are likely to be of interest to those users.

26 Claims, 4 Drawing Sheets

(56) References Cited

OTHER PUBLICATIONS

Terry et al., "Social Net: Using Patterns of Physical Proximity Over Time to Infer Shared Interests", 2002, Proceeding of Human Factors in Computing Systems, pp. 816-817.*

MG Siegler, "Ditto: The Social App for What You Should Be Doing", Mar. 5, 2011, retrieved from <http://web.archive.org/web/20110305214826/http://techcrunch.com/2011/03/03/ditto/>, retrieved on May 29, 2015.*

Ryan Kim, "Location Services Look to Future Check-Ins . . . With Friends", Mar. 4, 2011, retrieved from <http://web.archive.org/web/20110304195619/http://gigaom.com/2011/03/03/location-services-look-to-future-check-ins-with-friends/>, retrieved on May 29, 2015.*

Yohan Chon; Hojung Cha, "LifeMap: A Smartphone-Based Context Provider for Location-Based Services," Pervasive Computing, IEEE , vol. 10, No. 2, pp. 58,67, Apr.-Jun. 2011.*

Saiph Savage, N., Baranski, M., Elva Chavez, N., Hllerer, T.: I'm feeling loco: A location based context aware recommendation system. In: Advances in Location-Based Services. Lec. Notes in Geoinformation & Cartography, pp. 37-54. Springer, Heidelberg (2012).*

Manuel J. Barranco, Jos'e M. Noguera, Jorge Castro, and Luis Mart'inez, "A Context-Aware Mobile Recommender System Based on Location and Trajectory", 2012, Management Intelligent Systems, Advances in Intelligent Systems and Computing vol. 171, pp. 153-162.*

H. Huang, G. Gartner, "Using Context-Aware Collaborative Filtering for POI Recommendations in Mobile Guides", presented at the 8th International Symposium on Location-Based Services on Nov. 21-23, 2011, published in book entitled "Advances in Location-Based Services, 8th International Symposium on Location-Based Services, Vienna 2011" p. 131-147.*

Carsten Keβler, "Similarity Measurement in Context", Modeling and Using Context, Lecture Notes in Computer Science vol. 4635, 2007, pp. 277-290.*

\* cited by examiner

LOCATION BASED RECOMMENDATIONS

BACKGROUND

Social networks and other services allow a user to share information with other users and also to monitor the actions of those users. More particularly, users may exchange messages with one another, specify likes or dislikes, and may identify places (e.g., restaurants, stores, etc.) that the user has previously visited or is currently visiting. For instance, while a particular user is physically located at a particular merchant, the user may indicate to other users that the user is currently visiting that merchant. The users may access this information through a central site or through notifications that are transmitted to an account or a device associated with the users. However, in existing systems, the users that communicate with one another and that are able to view the actions performed by other users are generally already connected or linked in some manner. Moreover, the locations in which the users visit are typically fully disclosed to other users.

BRIEF DESCRIPTION OF THE DRAWINGS

The detailed description is set forth with reference to the accompanying figures, in which the left-most digit of a reference number identifies the figure in which the reference number first appears. The use of the same reference numbers in the same or different figures indicates similar or identical items or features.

DETAILED DESCRIPTION

Figure 1:
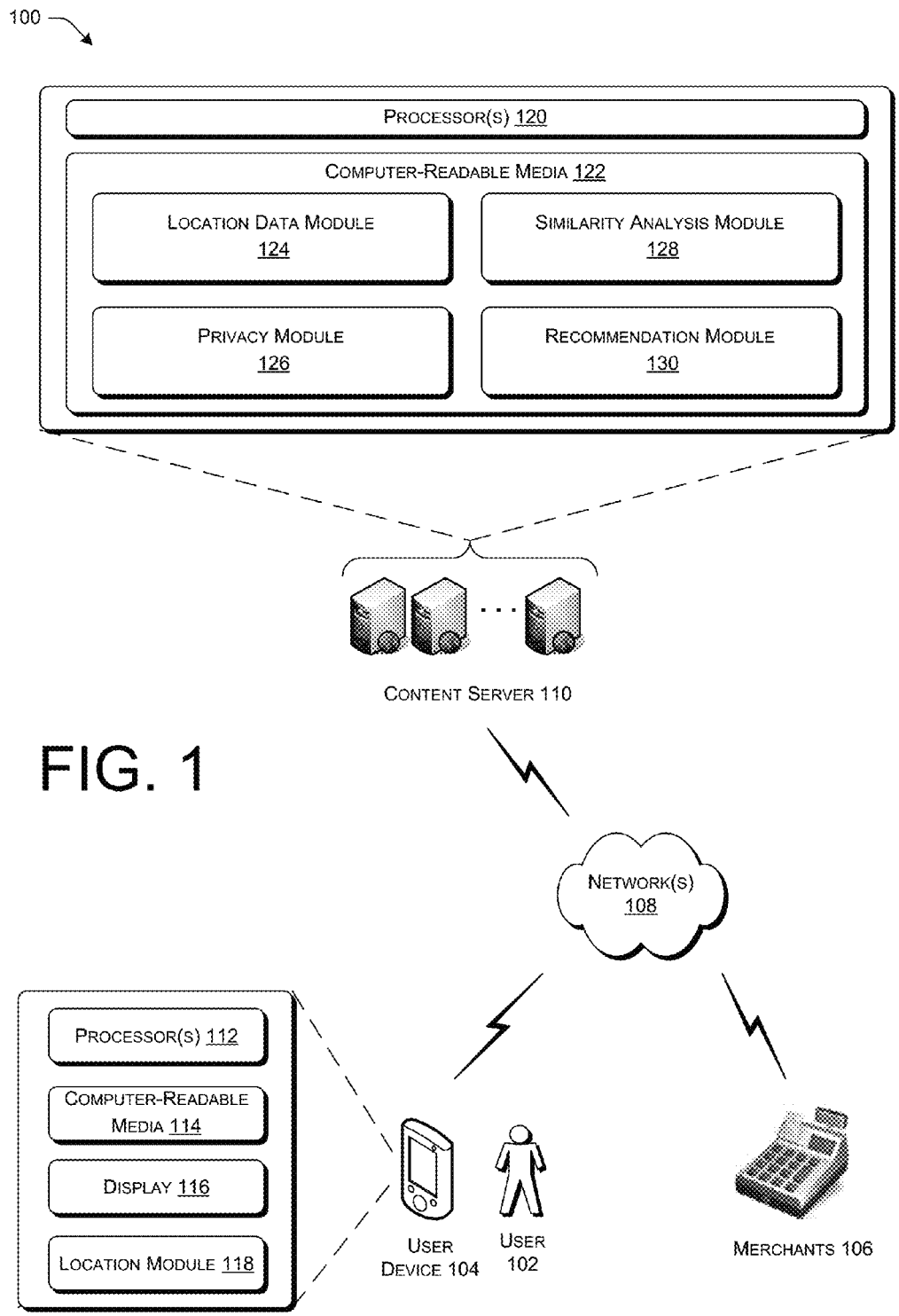
FIG. 1 is a diagram showing an example system including a user, a user device, one or more merchants, one or more networks, and a content server. In this system, one or more recommendations may be provided to users based at least in part on similarities to other users.

This disclosure describes systems and processes for determining similarities between users and then providing recommendations to users based on such similarities. More particularly, the systems and processes described herein may identify physical locations in which users have visited and compare those identified physical locations to physical locations frequented by other users. When it is determined that at least two users have visited the same physical locations, such as various merchants (e.g., restaurants, shops, museums, etc.), the systems and processes described herein may provide recommendations to those users. In certain embodiments, based on the similarity between users, the recommendations may identify merchants that are likely to be of interest to those users, such as merchants that those users have yet to visit. Furthermore, in addition to providing recommendations to users, the users may be informed that other users are likely to share similar interests. As a result, the users may be allowed to share their identity, either partially or fully, with those users that are determined to have similar interests.

In various embodiments, location data that may indicate a current physical location of a user or physical locations in which the user was previously located may be collected. The location data may be collected in any manner, including collecting the location data passively via a device associated with the user (e.g., mobile telephone, tablet device, personal digital assistant (PDA), etc.). The location data may be collected over the course of days, weeks, and even years in order to determine interests of a particular user. The location data may then be compared to the location data obtained for other users to determine whether different users have frequented the same locations (e.g., restaurants, shops, entertainment events). As a result, the systems and processes described herein may be able to identify users with similar interests based on where those users are going and/or what those users are actually doing.

Provided that the location data indicates that two users have visited the same or similar locations, recommendations for various items may be transmitted to those users. For instance, the recommendations may identify merchants that were visited by one user but have not been visited by the other user. As a result, the recommendations may introduce or promote merchants, places, promotions, events, etc., that are likely to be of interest to users. Furthermore, in response to establishing a certain amount of overlap between users, the users may be informed that other users are likely to have common interests. Subsequently, the users may correspond with one another and possibly reveal information, such as their respective identities, to each other. For example, because it has been determined that the two users frequent the same locations and, therefore, are likely to share similar interests, the systems and processes described herein may allow those two users to communicate with one another, share various types of information with the other user, or even meet one another.

In some embodiments, depending upon various privacy settings and/or a degree of similarity associated with locations visited by two different users, the users may mutually decide to reveal information about themselves to other users. Moreover, the actual names of the locations that each user has visited may not be revealed, but it may be revealed that there was substantial overlap between the locations visited by the users for the purpose of revealing users having similar interests. In certain embodiments, the difference between the common overlap and shared interests between users may provide new information for those users, such as restaurants, stores, entertainment events, etc. Once a certain amount of overlap is attained, the users may have the opportunity to reveal their identities, either partially or fully. For instance, the users may share their respective names or any other type of information and may otherwise communicate with one another. As a result, users may become aware of people, places, events, and other things that are likely to interest those users.

The discussion begins with a section, entitled "Example Environment," describing a system for providing recommendations based on location data associated with users. Next, the discussion includes a section, entitled "Location Data Based Recommendations," that describes a process for providing various types of recommendations to users. The discussion then moves on to a "Similarity Determination by the Content Server" section that describes determining similarities and differences between users and then providing recommendations based on such information. The discussion then includes a section, entitled "Example Processes," that illustrates and describes example processes for providing recommendations to users based on location data. Lastly, the discussion includes a brief "Conclusion".

This brief introduction, including section titles and corresponding summaries, is provided for the reader's convenience and is not intended to limit the scope of the claims, nor the proceeding sections. Furthermore, the techniques described above and below may be implemented in a number of ways and in a number of contexts. Several example implementations and contexts are provided with reference to the following figures, as described below in more detail. However, the following implementations and contexts are but a few of many.

Example Environment

FIG. 1 illustrates an example system 100 for collecting location data associated with users and then providing recommendations to users based at least in part on the similarity of the location data between users. Additionally, if it is determined that the location data for a particular user is sufficiently similar to another user, the users may informed that other users share similar interests and may be allowed to reveal information about one another. More particularly, the system 100 may include one or more users 102, one or more user devices 104 associated with the users 102, one or more merchants 106, one or more network(s) 108, and a content server 110. In various embodiments, the user 102 may operate the user device 104, which may include one or more processor(s) 112, computer-readable media 114, a display 116, and a location module 118. The content server 110 may also include one or more processor(s) 120 and computer-readable media 122, which may include a location data module 124, a privacy module 126, a similarity analysis module 128, and a recommendation module 130.

In various embodiments, the content server 110 may be a service provider, a service, or any other server or entity that monitors current or past physical locations (e.g., location data) of users 102. More particularly, the content server 110 may identify specific physical locations that are being visited by a user 102, such as by monitoring the physical location of a device that is in close proximity to the user 102. For instance, the content server 110 may determine the location of a mobile telephone, a PDA, a tablet device, etc., that is being carried by the user 102. As a result, since the specific physical location of the user 102 may be known, the content server 110 may determine which establishments, events, or merchants 106 (e.g., restaurants, stores, etc.) are being visited by the user 102 and the duration of time in which the user 102 is at that particular physical location. That is, the content server 110 may identify which establishments or merchants 106 correspond with those physical locations. The content server 110 may monitor, collect, and maintain this location data for any number of users 102.

Upon obtaining the location data, the content server 110 may determine whether different users 102 visit or frequent the same merchants 106. In other words, the content server 110 may determine whether there is overlap between places that first user 102 frequents and places that other users 102 visit. When it is determined that a certain amount or degree of overlap exists between at least two users 102, the content server 110 may infer that those two users 102 are likely to have common interests, likes, dislikes, etc. Accordingly, the content server 110 may determine that the places that have been visited by one user 102, but not the other, may be of interest to the user 102 that has not visited those places. That is, the content server 110 may determine that the places outside of the overlap may be of interest to each user 102. Therefore, the places that have yet to be visited by the users 102 may then be recommended to the users 102, thus possibly introducing the users 102 to new places or events that may be of particular interest.

For instance, assume that a first user 102 and the second user 102 have both visited a predetermined number of the same places (e.g., restaurants, bars, stores, etc.) or events (e.g., sporting events, social events, etc.). Further assume that the first user 102 has frequented additional places or events in which the second user 102 has not visited. Since the users 102 have been to the same places or events, which may indicate that the users 102 have similar interests or tastes, the users 102 are likely to be of interest in the other places or events the users 102 have visited. Therefore, the content server 110 may determine that that the second user 102 is likely to be interested in visiting the additional places or events that have been experienced by the first user 102, but not the second user 102. As a result, these additional places or events may then be recommended to the second user 102. In various embodiments, the recommendations may relate to anything, such as, for example, entertainment (e.g., concerts, movies, sporting events, etc.), food (e.g., restaurants, grocery stores, etc.), social events (e.g., parties, etc.), and shopping (e.g., stores, shops, etc.).

In addition to providing recommendations that identify places that may be of interest to users 102, the recommendations may also inform or indicate that the user 102 may be interested in associating with other users 102 that have similar interests. In various embodiments, based at least in part on the location data associated with different users 102, the content server 110 may identify users 102 that have visited the same, or similar, places or events. Since these users 102 are likely to share similar interests, the content server 110 may infer that these users 102 may want to know or communicate with one another. Accordingly, the content server 110 may notify a particular user 102 that other users 102 have frequented the same places or events as them. At that point, the content server 110 may allow those users 102 to introduce themselves to one another. For example, the users 102 may reveal their respective identities or any other information that the users 102 deem fit. That is, the users 102 may have the discretion to mutually reveal any information about themselves to other users 102 that share similar interests, meaning that that the users 102 may fully disclose their identity or can communicate with other users 102 while maintaining anonymity. In some embodiments, the content server 110 may inquire whether users 102 would like to contact, or would like to be contacted by, persons with similar interests.

In some embodiments, the user 102 may operate the user device 104 to perform various functions associated with the user device 104, which may include the one or more processor(s) 112, the computer-readable media 114, the display 116, and the location module 118. Furthermore, the user 102 may utilize the user device 104 acquire items (e.g., products, services, etc.), to check into a particular place (e.g., a merchant 106), or to perform some other action with respect to a physical location. In other embodiments, the location data may be obtained without the user 102 having to utilize the user device 104, with the exception of carrying the user device 104 while the user 102 is frequenting different places or events (e.g., work, home, restaurants, stores, social events, etc.).

In some embodiments, the user device 104 may be any type of device that is capable of transmitting location data to the content server 110 or that may otherwise allow the content server 110 to obtain location data corresponding to a previous or current physical location of the user device 104. For instance, the user device 104 may include a personal computer, a laptop computer, a cellular telephone, a PDA, a tablet device, an electronic book (e-Book) reader device, or any other device that may be used to indicate its previous or current physical location or that may allow the content server 110 to determine this information. Moreover, the user 102 may utilize the user device 104 to access the network(s) 106. For instance, the user 102 may utilize the user device 104 to provide some indication that the user 102 is currently at a particular place or event. For instance, the user 102 may check into a particular place (e.g., merchant 106), conduct a transaction with a merchant 106, or otherwise indicate a current geographic location in which the user device 104 is located. Further, the user device 104 shown in FIG. 1 is only one example of a user device 104 and is not intended to suggest any limitation as to the scope of use or functionality of any user device 104 utilized to perform the processes and/or procedures described herein.

The processor(s) 112 of the user device 104 may execute one or more modules and/or processes to cause the user device 104 to perform a variety of functions, as set forth above and explained in further detail in the following disclosure. In some embodiments, the processor(s) 112 may include a central processing unit (CPU), a graphics processing unit (GPU), both CPU and GPU, or other processing units or components known in the art. For instance, the processor(s) 112 may allow the user device 104 to perform any action that allows the content server 110 to derive location data associated with the user device 104. Additionally, each of the processor(s) 112 may possess its own local memory, which also may store program modules, program data, and/or one or more operating systems.

In at least one configuration, the computer-readable media 114 of the user device 104 may include any components that may be used to transmit or otherwise indicate its previous or current physical location to the content server 110. Depending on the exact configuration and type of the user device 104, the computer-readable media 114 may also include volatile memory (such as RAM), non-volatile memory (such as ROM, flash memory, miniature hard drive, memory card, or the like), or some combination thereof.

In various embodiments, the user device 104 may also have input device(s) such as a keyboard, a mouse, a pen, a voice input device, a touch input device, etc. The user device 104 may also include the display 116 and other output device(s), such as speakers, a printer, etc. The user 102 may utilize the foregoing features to interact with the user device 104, the merchants 106, and/or the content server 110 via the network(s) 108. More particularly, the display 116 of the user device 104 may include any type of display 116 known in the art that is configured to present (e.g., display) information to the user 102. For instance, the display 116 may be a screen or user interface that allows the user 102 to interact with the merchants 106 or the content server 110, that allows the user 102 to indicate a current or past physical location, or that allows the content server 110 to obtain location data associated with the user device 104.

Additionally, the location module 118 of the user device 104 may include any mechanism that allows the user device 104 to convey location data to the content server 110 or that allows the content server 110 to obtain location data relating to the user device 104. For the purposes of this discussion, location data may refer to any type of data that enables the content server 110 to determine a current or past physical location of the user device 104. In some embodiments, the location module 118 may allow users 102 to perform some user actuation that indicates the current physical location of the user device 104. For instance, the location module 118 may enable users 102 to check into a particular merchant 106, to engage in a transaction or some other information exchange with the merchant 106, or to perform any other action that indicates the current or past physical location of the user device 104. If a particular user device 104 becomes known to a merchant 106, that merchant 106 may transmit that data to the content server 110 or the content server 110 may otherwise obtain the location data from the merchant 106.

Alternately, or in addition, the location module 118 may allow the content server 110 to obtain location data associated with the user device 104. For example, the location data may be obtained by the content server 110 passively without any action being performed by the user 102. In some embodiments, the location data may be obtained via global positioning system (GPS) technology, cell tower triangulation, or any other manner that can be used to identify the physical location of the user device 104. That is, even if the user 102 is not performing any action with respect to the user device 104, the content server 110 may nonetheless obtain location data from the user device 104 that indicates the current or past physical locations of the user device 104. In some embodiments, the user device 104 may include an application that somehow enables the content server 110 to obtain the location data.

In various embodiments, the one or more merchants 106 may be any individual or entity that is associated with a physical location that may be visited or frequented by users 102. For instance, the merchants 106 may relate to entertainment, food, shopping, events, etc., as described above. That is, the merchants 106 may include or represent sporting events, social events, concerts, movies, restaurants, retail stores, shops, hotels, bars, nightclubs, museums, and/or any other place or event that may be visited and experienced by users 102. The merchants 106 may allow the users 102 to acquire items (e.g., products, services, etc.), to check into the merchant 106 if the users 102 are currently visiting a particular merchant 106, or to otherwise interact with the merchant 106. The merchant 106 may also allow the content server 110 to obtain location data associated with the user device 104 of a particular user 102 in order to derive the current or past physical location of the user 102.

In some embodiments, the network(s) 108 may be any type of network known in the art, such as the Internet. Moreover, the user device 104, devices associated with the merchants 106, and the content server 110 may communicatively couple to the network(s) 108 in any manner, such as by a wired or wireless connection. The network(s) 108 may also facilitate communication between the user device 104, the devices associated with the merchants 106, and the content server 110, and also may allow for the transfer of location data or communications therebetween. For instance, the content server 110 may obtain location data associated with the user devices 104 from the user devices 104 themselves or from one or more merchants 106.

In addition, and as mentioned previously, the content server 110 may include the one or more processor(s) 120 and the computer-readable media 122, which may include the location data module 124, the privacy module 126, the similarity analysis module 128, and the recommendation module 130. The content server 110 may also include additional components not listed above that may perform any function associated with the content server 110. In various embodiments, the content server 110 may be any type of server, such as a network-accessible server. The content server 110 may also be any type of entity that obtains location data associated with various user devices 104 in order to determine a physical location of the users 102, and uses that location data to provide recommendations to the users 102. In other embodiments, the processor(s) 120 and the computer-readable media 122 of the content server 110 may be the same as, similar to, or different from the processor(s) 112 and the computer-readable media 114, respectively, of the user device 104.

In various embodiments, the location data module 124 of the content server 110 may obtain location data that indicates a previous or current physical location of the user devices 104 associated with the users 102. That is, the location data module 124 may obtain location data that may represent what users 102 are doing, where the users 102 have currently been, and/or where the users 102 are currently located. The location data may be provided by the user 102 via the user device 104 or it may be obtained by the location data module 124 in a passive manner. For instance, the location data may be obtained from the user device 104 via GPS technology, cell tower triangulation, or any other method of determining a physical location of the user device 104. Once obtained, the location data module 124 may maintain the location data for each user device 104, such that the location data module 124 may be aware of previous physical locations and current physical locations of each user device 104.

Furthermore, the location data module 124 may store known physical locations of the merchants 106. For instance, the location data module 124 may maintain a list that identifies where certain places (e.g., restaurants, stores, bars, etc.) and events (e.g., sporting events, concerts, social events, etc.) are physically located. Based at least in part on the actual time, or day of the week, in which each user 102 was at each physical location, the location data module 124 may determine the particular place or event where each user 102 has been. For example, if the user 102 was at a certain physical location at a particular time, the location data module 124 may determine that the user 102 was visiting a particular restaurant or store, for instance. As a result, the location data module 124 may identify, with a relative high degree of confidence, which places or events each of the users 102 have visited.

In additional embodiments, the privacy module 126 may configure or maintain various privacy settings for the users 102 and their corresponding user devices 104. With respect to receiving recommendations for places to visit, the privacy module 126 may allow the users 102 to determine whether they would like to receive such recommendations. Moreover, the users 102 may also control the extent or the degree in which the users 102 receive recommendations. For example, some users 102 may elect to receive all recommendations, some users 102 may decide to receive no recommendations, while other users 102 may elect to receive any number of recommendations. Therefore, the number of recommendations that are provided by the content server 110, and the frequency in which those recommendations are provided, may vary based on the preferences of each specific user 102.

Furthermore, and as stated above, when it is determined that there is overlap between the places or events that different users 102 visit, the content server 110 may provide the users 102 with this information. For example, the content server 110 may inform users 102 that there are other users 102 that have frequented the same or similar places and, therefore, those users 102 are likely to share common interests. The privacy module 126 may establish privacy settings that control to the extent to which users 102 correspond to one another. In various embodiments, the default privacy settings may be high, meaning that the identity of users 102 may not be initially revealed. However, these privacy settings may be altered by either the content server 110 or the users 102. In addition, when users 102 are made aware that there are other users 102 that appear to have similar interests, the users 102 may have the discretion to mutually reveal information about themselves. For example, the users 102 may reveal their respective identities or other types of information (e.g., demographic information, places of interest, likes, dislikes, etc.).

The similarity analysis module 128 of the content server 110 may determine that various users 102 have similar interests. More particularly, the similarity analysis module 128 may utilize the location data to identify the places or events visited by users 102 and then determine whether different users 102 have also visited those places or events. As a result, the similarity analysis module 128 may determine that certain users 102 have common overlap with respect to the places or events that those users 102 have frequented. In addition to identifying places that multiple users 102 have visited, the similarity analysis module 128 may identify places or events that one of the users 102 has visited but that other users 102 have not (e.g., different places or events). As a result, based at least in part on the location data associated with different users 102, the similarity analysis module 128 may determine both persons and places or events that may be of particular interest to certain users 102.

In response to the similarity analysis module 128 identifying common overlap between different users 102, the recommendation module 130 may provide recommendations to users 102 that identify persons, places and/or events that may be of interest to those users 102. For example, the recommendation module 130 may recommend places that fall outside of the overlap, which may include places or events that a particular user 102 has not experienced. The recommendation module 130 may also notify a particular user 102 that there are persons that that user 102 may be interested in knowing or communicating with. Additionally, if authorized by the users 102, the recommendation module 130 may identify those persons of interest or reveal certain types of information about those users 102. As a result, a particular user 102 may receive recommendations for places (e.g., restaurants, stores, events, etc.) that are likely to be of interest to those users 102 and/or recommendations for other users 102 that, based on the location data, appear to have similar interests. Accordingly, users 102 may experience new places or events and possibly meet other individuals that the users 102 would be interested in knowing.

Location Data Based Recommendations

Figure 2:
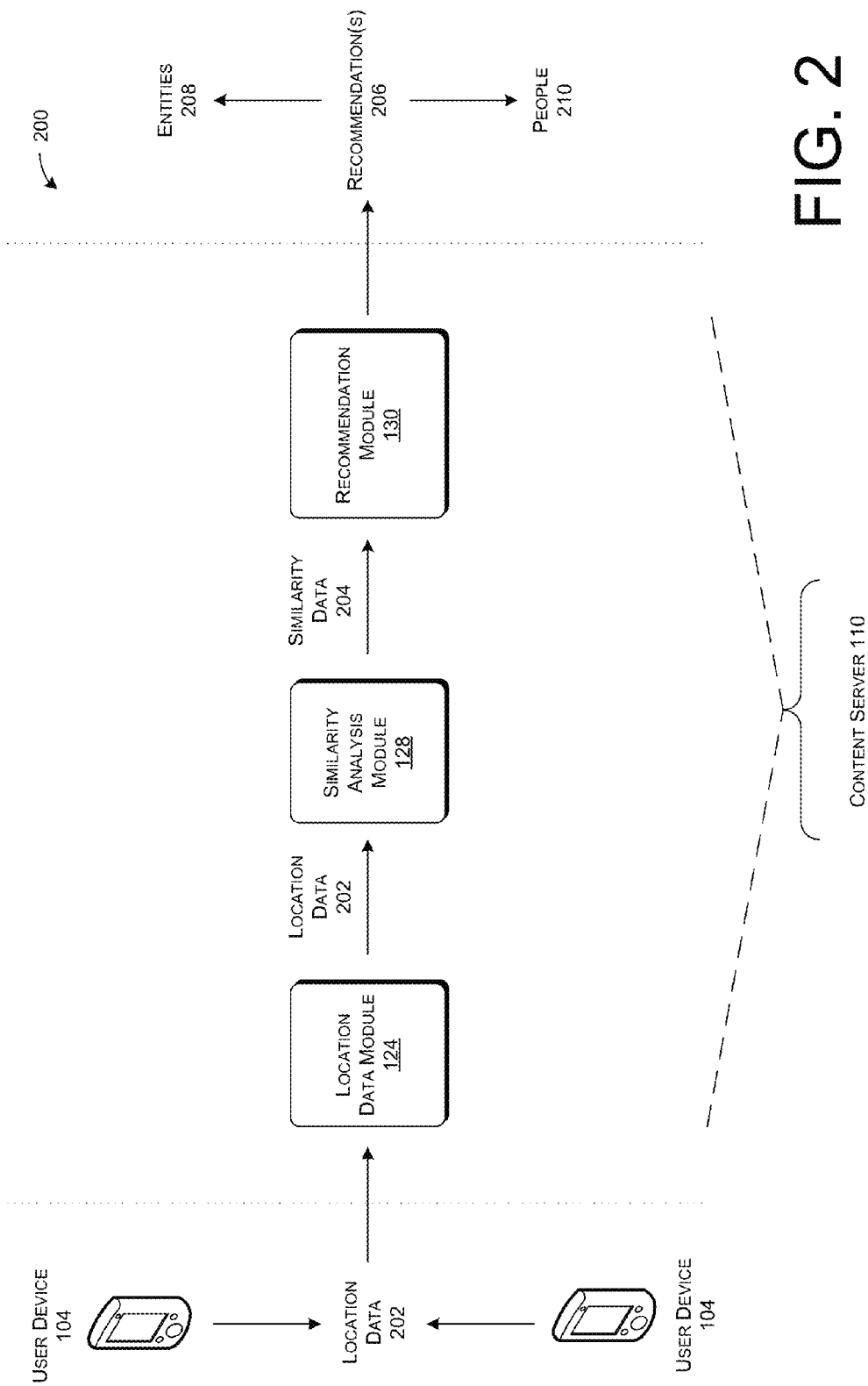
FIG. 2 is a diagram showing a process for providing recommendations to users based at least in part on location data associated with those users.

FIG. 2 illustrates a system 200 that represents a process for providing recommendations to users based on location data derived from devices associated with those users. More particularly, location data 202 may be identified for one or more user devices, such as user devices 104, for example. Although two user devices 104 are illustrated in FIG. 2, location data 202 may be obtained for any number of user devices 104. A user 102 may carry such user devices 104 (e.g., mobile telephones, PDAs, tablet devices, etc.) when the user 102 visits various places or events, such as work, restaurants, retail stores, sporting events, social events, etc. Therefore, the location data 202 may represent places where the user 102 was previously located or where the user 102 is currently located.

In various embodiments, the location data module 124 of the content server 110 may obtain the location data 202. More particularly, the location data module 124 may collect the location data 202 passively, meaning that the location data 202 may be obtained without the user 102 having to check into a particular place or otherwise taking any action. Instead, provided that the user 102 is carrying a user device 104 in which the content server 110 is able to monitor its physical location, the location data 202 associated with that user device 104 may be collected so long as the user device 104 is powered on. In various embodiments, the location data 202 may be obtained via GPS technology or cell tower triangulation, or the user device 104 may have an application that allows for the location data 202 to be collected by the content server 110. Moreover, the user 102 may need to opt in, such as by agreeing to certain conditions, before the content server 110 is able to collect the location data 202 associated with that user 102.

In some embodiments, the location data 202 that is collected may be editable and/or suppressed. For example, the content server 110 may be gathering the location data 202 in an attempt to determine similarities between places or events visited by different users 102. That is, the content server 110 may attempt to identify users 102 that have similar interests in order to introduce the users 102 to one another or to recommend places that have been visited by some users 102 but have not been visited by other users 102 that have similar interests. As a result, the content server 110 may seek to utilize location data 202 that meaningfully reflects interests of the user 102, likes or dislikes, user preferences, etc. Therefore, the content server 110 may suppress, edit, or disregard certain location data 202 if it is determined that that location data 202 likely does not reflect interests of a particular user 102. The location data 202 may be suppressed for a certain amount of time or the location data 202 may be edited or disregarded retroactively (e.g., after the location data 202 has been collected).

For example, assume that a user 102 spends a week babysitting for a family friend. Provided that the user 102 carries a user device 104 with him/her, location data 202 associated with that user 102 may be obtained. However, this location data 202 may indicate that the user 102 is spending a significant amount of time at a single location. Moreover, this location data 202 may not reflect places (e.g., restaurants, retail stores, etc.) that the user 102 likes to visit, events the user 102 likes to attend, and so on. Accordingly, the location data module 124 may suppress, edit, or disregard this location data 202 since there may be a low probability that the location data 202 could be utilized to provide the user 102 with information that he/she would find interesting.

Furthermore, the location data 202 may be collected by the location data module 124 in any manner. For instance, and as stated above, the location data 202 associated with the user device 102 may be collected using GPS technology, cell tower triangulation, or any other manner known in the art. In some embodiments, the location data 202 may be obtained provided that the user device 104 is in the same physical location for a threshold amount of time, which may be any predetermined amount of time. In addition, the location data 202 may be obtained in response to some user actuation, such as the user 102 checking into a merchant 106, transmitting the location data 202 to the content server 110, or otherwise interacting with the user device 104.

In other embodiments, based on the location data 202 that is collected, the location data module 124 may determine which place, merchant 106, event, etc., the user 102 is visiting or previously has visited. In particular, the location data module 124 may maintain a list or database of known merchants 106, places, events, etc., and their corresponding physical locations that users 102 may visit. This list may be updated over time to help ensure that the list is current. When the location data 202 is collected, the location data module 124 may access this list to determine where the users 102 visited or what the users 102 were actually doing. The location data module 124 may also associate a time of day or a day of the week (e.g., timestamps, etc.) with the location data 202, where the timestamp may indicate a date and/or time that the user 102 was at the physical location associated with the location data 202. The timestamps may be utilized to help identify the specific merchant 106, place, event, etc., that a user 102 was visiting at a particular time. For instance, in an urban area where multiple merchants 106 are situated in close proximity to the same physical location (e.g., a mall, a multi-floor shopping area, etc.), it may be difficult to determine which merchant 106 a user 102 was visiting. However, if a timestamp associated with the location data 202 indicated that the user 102 was present at that physical location at 1:00 am, it may be more likely that the user 102 was at a nightclub, as opposed to a retail store.

In other embodiments, the amount of time spent in a particular physical location or the amount of time spent between physical locations may suggest where the user 102 is actually visiting. For instance, the location data module 124 may infer that the user 102 is shopping if the location data 202 indicates that the user 102 stays in one physical location for a short amount of time, and then moves to a different physical location for a short amount of time. Similarly, if the location data 202 is consistent with a physical location associated with a restaurant, and the user 102 stays at that physical location for one to two hours, the location data module 124 may determine that the user 102 is eating at that restaurant. Moreover, the location data module 124 may conclude that the user 102 is likely at work if the location data 202 suggests that the user 102 is in the same physical location for eight hours, and that the user 102 typically frequents that physical location on weekdays.

Moreover, the location data module 124 may identify what the user 102 is actually doing or where the user 102 is going based on historical data. For example, if the location data 202 associated with a particular user 102 is in close proximity to a place or event that the user 102 has previously visited, the location data module 124 may infer that the user 102 is visiting that same place or event. In various embodiments, the location data module 124 may make this determination if the user 102 is within a predetermined distance (e.g., 50 feet, 100 feet, etc.) from that place or event. Therefore, the specific place or event that the user 102 is visiting may be identified without the user 102 needing to perform some action that identifies the place event where the user 102 is currently located.

In addition to the techniques described above, the location data 202 may be obtained in other ways. For instance, the user device 104 may include an application that is continuously monitoring whether any merchants 106 are in close proximity to the user device 104. If so, this application may identify those merchants 106, which may be collected by the content server 110. In addition, interactions between merchants 106 and the user devices 104 may allow the location data module 124 to obtain the location data 202. For instance, merchants 106 may have a device that identifies user device 104 when the user devices 104 come within a certain proximity of the merchants 106. Moreover, such a device may transmit signals to the user devices 104 that indicate information that can be viewed by the user 102, such as promotions, deals, new products/services, the user's 102 typical order or purchase, etc.

Once the location data 202 is obtained, the location data module 124 may maintain the location data 202 for further analysis. In certain embodiments, the location data 202 may be analyzed by the similarity analysis module 128. More particularly, the similarity analysis module 128 may consider the location data 202 associated with various users 102 and determine whether different users 102 have frequented the same places or events. That is, the similarity analysis module 128 may identify common overlap between the places or events that different users 102 are visiting in an attempt to identify users 102 with similar interests. This common overlap may be referred to as similarity data 204. For users 102 that have common overlap between the places or events that they have visited, the similarity data 204 may also indicate differences between the places or events that the users 102 visited. For example, provided that two users 102 frequented a predetermined number of the same places or events, the similarity analysis module 128 may identify places or events in which one of the users 102 have visited, but the other has not. Since the users 102 are likely to share similar interests, the different places or events that each user 102 has visited may be of interest to the other user 102.

In certain embodiments, the similarity analysis module 128 may accumulate a certain amount of location data 202 prior to actually determining the common overlap between different users 102. Moreover, before determining that two different users 102 have common overlap between their respective location data 202, the similarity analysis module 128 may determine that the places or events visited by both of the users 102 should meet or exceed a certain threshold, which may be any number. For example, the similarity analysis module 128 may determine that two users 102 have common overlap when the users 102 have visited the same five places or events. This threshold may vary based on the location data 202 being considered or the particular users 102 that are associated with that location data 202.

Therefore, the similarity data 204 may represent the similarity between places (e.g., merchants 106, events, etc.) that multiple different users 102 have visited. The similarity data 204 may also include different places that have been visited by some users 102, but not by others, and that may be intriguing or of particular interest to certain users 102. In additional embodiments, genres associated with the places, venues, merchants 106, events, etc., may be considered when determining the common overlap between users 102. For instance, the similarity analysis module 128 may keep track of tags associated with each place or event, where the tags may represent a genre associated with that place or event (e.g., restaurants, retail stores, sporting events, etc.). Moreover, the similarity analysis module 128 may identify genres associated with the places or events that each user 102 visits and then use those genres to determine similarities between users 102. For example, if a first user 102 frequents a particular Thai restaurant and a second user 102 also visits a Thai restaurant, but not necessarily the same Thai restaurant as the first user 102, these restaurants may be deemed as being similar and may count towards determining whether the first user 102 and the second user 102 have a threshold amount of common overlap. The same could be said about two different users 102 that frequent coffee shops, albeit different coffee shops. In another embodiment, when users 102 visit the same establishment but in different physical locations (e.g., a fast food chain restaurant, a large retail store, etc.), this may also be considered visiting the same place.

Either before or after determining the similarity between different users 102, the content server 110 may allow the users 102 to provide user input relating to the places or events visited by those users 102. In various embodiments, users 102 may indicate that certain places or events associated with their respective location data 202 should be marked as private. For instance, a particular user 102 may not want to disclose private or confidential information relating to places or events that the user 102 visits, such as a doctor's office, a vacation location, etc. As a result, the location data 202 and the places or events associated with that location data 202 may not be considered and possibly deleted. In other embodiments, users 102 may submit preferences or ratings relating to the places or events that those users 102 visit. For example, the users 102 may specify whether they liked or disliked a particular place or event. If it is determined that the user 102 assigned a poor or low rating to a place or event, or otherwise indicated that they disliked that place or event, that particular place or event may not be considered when determining the similarity between that user 102 and other users 102. Moreover, it is contemplated that any type of information provided by users 102 may influence similarity determinations between users 102 or the recommendations 206 that are provided to users 102.

In some embodiments, once the places or events associated with the location data 202 have been determined, such data may be passed through one or more filters. For instance, based on input provided from a particular user 102, the location data 202 and/or corresponding places or events may be passed through a privacy filter. The privacy filter may identify and remove certain location data 202, places, or events that the user 102 would prefer to remain private. In addition, this data may also be passed through a validation filter, which may identify places or events that are determined to be not of particular interest to the user 102. As a result, the similarity analysis module 128 exclude these places or events when determining the similarity between two different users 102.

Once both similarities and differences between places or events that users 102 have visited have been identified, the similarity data 204 may be utilized by the recommendation module 130. As stated above, the recommendation module 130 may provide one or more recommendations 206 to the users 102. More particularly, the recommendations 206 may include recommendations 206 for entities 208 that the users 102 may be interested in visiting and/or people 210 that the users 102 may be interested in meeting, knowing, or corresponding with. That is, since the similarity data 204 may indicate that different users 102 are likely to have common interests, the recommendation module 130 may make the users 102 aware of entities 208 (e.g., restaurants, retail stores, events, etc.) that the users 102 have not visited but may be interested in visiting. Moreover, the recommendation module 130 may also make the users 102 aware of people 210 that share similar interests as those users 102.

As stated above, provided that at least two users 102 had common overlap with respect to the places or events that those users 102 visited, the recommendation module 130 may recommend or identify places or events (e.g., entities 208) that have been visited by one user 102, but not the other. That is, the recommendation module 130 may highlight the differences between the places or events the users 102 visited or the things those users 102 did. In addition, the recommendations 206 for the entities 208 may relate to lifestyle enhancements. For instance, these types of recommendations 206 may introduce users 102 to places, events, services, products, etc., that are unknown to the users 102 or that have not been experienced by those users 102. In various embodiments, although the differences between users 102 may be exposed to the users 102 via the recommendation 206, the similarities between users 102, such as the location data 202 associated with each user 102 or the names of the actual places or events that each user 102 visited, may remain hidden. In other embodiments, some or all of this information may be revealed to the users 102.

In some embodiments, the recommendations 206 may be provided to users 102 so long as a threshold level of commonalities exists between at least two users 102. For instance, assuming that the places or events that two users 102 have each visited is greater than a predetermined number (e.g., five), recommendations 206 for entities 208 that are different from one another may be provided to the other user 102. For the purposes of this discussion, the entities 208 may include establishments, places, merchants 106, events, goods, services, promotions, and anything else that may be of interest to the users 102, such as restaurants, retail stores, shops, bars, theatres, museums, sporting events, etc. In addition, the number and/or frequency of recommendations 206 that are provided to users 102 may vary depending upon the particular user 102 or the extent of similarity between different users 102. For example, certain users 102 may indicate that they would like to receive the recommendations 206 more or less frequent. Moreover, the greater the overlap between users 102 may cause the content server 110 to provide a greater amount of recommendations 206 to users 102, and vice versa.

In other embodiments, the recommendations 206 may be filtered so that the recommendations 206 that are most likely to be of interest to users 102 are actually provided to the users 102. For instance, recommendations 206 relating to entities 208 that are likely to be already known by a particular user 102 may be filtered out (e.g., removed, disregarded, etc.) such that users 102 may receive recommendations 206 that are likely to be most relevant to those users 102. In addition, recommendations 206 relating to people 210 may be filtered so that the recommendations 206 relate to people 210 that the users 102 do not know. As a result, users 102 may be introduced to new people 210 that are likely to have interests in common with those users 102.

Furthermore, the recommendation module 130 may consider any type of information when determining which recommendations 206 should be provided to a particular user 102. More particularly, the recommendation module 130 may consider user preferences or other information known about the user 102, such as preferred merchants 106, preferred geographic locations, likes/dislikes, the user's 102 typical schedule, historical data, etc. For example, the recommendations 206 that are provided to that particular user 102 may be consistent with the information that is currently known about that user 102. In addition, the recommendations 206 may be weighted based at least in part on the degree of likelihood that the user 102 is going to be interested in the recommendation 206. For instance, recommendations 206 relating to entities 208 that are associated with a geographic region that is less desirable to the user 102 may be weighted relatively low, and vice versa. On the other hand, if it is known that the user 102 is an avid coffee drinker, a recommendation 206 relating to a coffee shop in which the user 102 has not visited may be weighted relatively high.

Furthermore, the recommendations 206 provided to users 102 may be based at least in part on context information, such as a context relating to the places or events that are visited by users 102. That is, in addition to identifying the particular place or event associated with a certain location data 202 point, the content server 110 may also determine various information relating to what the user 102 was actually doing at that location. For instance, the content server 110 may infer that the user's 102 visit at that location was associated with an event at or around that location, services rendered at that location, things or items consumed at that location (e.g., food, art, a game, etc.), etc. This context information may be determined by the content server 110 or may be provided by users 102 before, during, or after the users 102 visit that location. In some embodiments, the content server 110 may allow users 102 to annotate their respective location data 202 with additional information that indicates or suggests a context relating to the user's 102 visit at certain locations.

As a result, the particular places or events visited by users 102 and/or the context surrounding the users' 102 visit may influence the recommendations 206 provided to those users 102. For example, assume that the content server 110 has determined that a first user 102 and a second user 102 have both visited the same merchant 106, which includes both a restaurant and a venue for concerts. Further assume that the context information associated with the first user 102 and the second user's 102 visit to that location indicates that both the first user 102 and the second user 102 were eating at the restaurant while visiting that location. Since it is determined that the users 102 visited the same location and were engaged in the same activity at that location, the location data 202 associated with these visits may be deemed similar and may be used when providing recommendations 206 to these users. However, now assume that the context information indicates that the first user 102 visited that location to attend a concert while the second user 102 visited that location to eat at the restaurant. Although the first user 102 and the second user 102 appear to have visited the same location, since the respective activities of the first user 102 and the second user 102 were different, the content server 110 may determine that this location data 202 should not be utilized to show that the first user 102 and the second user 102 share similar interests. Therefore, prior to actually providing recommendations 206 to one or more users, the context information may be used to determine whether there is sufficient similarity between the places or events that have been visited by the users 102.

The particular recommendations 206 that are provided to users 102 may also be based on a current location of those users 102. That is, the recommendations 206 may be targeted to users 102 if the current location of those users 102 can be determined. For example, if the location data 202 for a certain user 102 indicates that that user 102 is currently in downtown Seattle, the recommendation module 130 may provide recommendations 206 to the user 102 that relate to entities 208 in, or around, downtown Seattle. Moreover, the recommendations 206 may targeted to users 102 based at least in part on the behavior of those users 102. For instance, the recommendations 206 that are provided to users 102 may be based on an acquisition history of a user 102 or other actions that have previously been taken by that user 102.

The recommendations 206 that are to be provided to users 102 may also be extended to different geographic regions. More particularly, based on similarities between different users 102, the recommendation module 130 may identify recommendations 206 that may associated with a first geographic region (e.g., Seattle, Wash.). However, if a user 102 travels to a different geographic region (e.g., New York City, N.Y.), those recommendations 206 relating to the first geographic region may no longer apply. Accordingly, the recommendation module 130 may identify entities 208 in the second geographic region 308 that may be the same or similar to the entities 208 that were to be recommended in the first geographic region. As a result, the recommendation module 130 may identify entities 208 (e.g., restaurants, stores, events, etc.) in the second geographic region that are also likely to be of interest to the user 102. In additional embodiments, the recommendation module 130 may also be able to identify people 210 in the second geographic region that the user 102 may be interested in meeting or otherwise interacting with.

In various embodiments, the recommendations 206 may be provided to users 102 in a dynamic (e.g., real-time) manner. More particularly, the recommendations 206 provided by the recommendation module 130 may be targeted to users 102 based at least in part on the current physical location of the user devices 104 that correspond to the users 102. As a result, the recommendation module 130 may identify entities 208 (e.g., restaurants, stores, etc.) that are in close proximity to the users 102. Moreover, the recommendation module 130 may inform users 102 of what people 210 that have similar interests are doing in the near future (e.g., 2-3 hours). Therefore, since those people 210 are likely to have interests that are similar to the users 102, the entities 208 that those people 210 are visiting are likely to be of interest to those users 102. In other embodiments, the content server 110 may visually illustrate where such people 210 are located and/or may show the locations that include the greatest concentration of people 210 that have similar interests.

As stated above, the recommendations 206 may reveal not just what users 102 are likely to be interested in, but also which people 210 the users 102 should or may like to know, based at least in part on commonalities between those users 102. Moreover, when the recommendation module 130 is able to identify people 210 that are likely to share similar interests to a particular user 102, the recommendation module 130 may inform the user 102 that such people 210 exist. As a result, the user 102 and the people 210 with similar interests may mutually exchange information, such as their respective identities or any other type of information. As a result, the user 102 may be exposed to people 210 that are likely to share common interests with that user 102 and may be provided the opportunity to be acquainted with such people 210.

Upon informing a particular user 102 that there are people 210 that are likely to share similar interests, information may be mutually exchanged with one another. Such information may be revealed based on specific user preferences. Moreover, default privacy settings may allow for the users 102 to correspond with such people 210 while still maintaining anonymity. The users 102 may adjust the privacy settings in order to reveal additional information about themselves. In other embodiments, the users 102 may reveal their identity, communicate with one another, and/or reveal any other type of information (e.g., likes/dislikes, use preferences, etc.).

Similarity Determination by the Content Server

Figure 3:
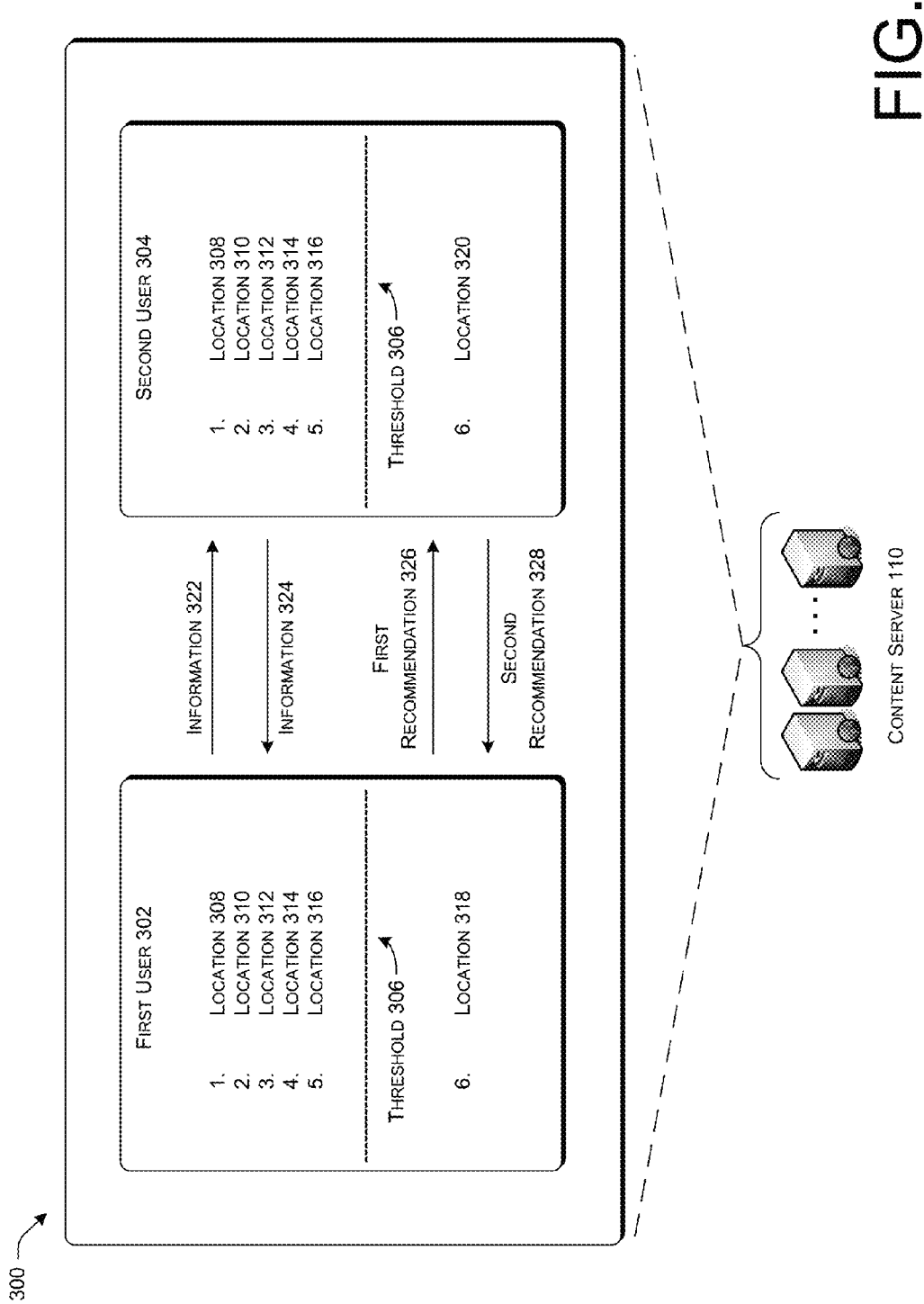
FIG. 3 is a diagram showing components associated with a content server that allows users to receive recommendations based at least in part on interests shared with other users.

FIG. 3 illustrates a diagram representing a system 300 for determining similarity between different users and then providing recommendations 206 to those users. More particularly, the content server 110 may obtain location data 202 that may indicate a current or past location of user devices 104 associated with various users 102. Based on that location data 202, the content server 110 may identify which places or merchants 106 (e.g., restaurants, events, stores, etc.) the users 102 are or were visiting. In response to identifying what the users 102 were actually doing, the content server 110 may identify common overlap between different users 102, meaning that the content server 110 may determine whether certain users 102 visited the same places or events. As a result, since it may be determined that different users 102 visited the same places or events, the content server 110 may determine that different users 102 may have at least some similar interests. Then, the content server 110 may recommend the places or events that fall outside the common overlap to each of the users 102. Moreover, the content server 110 may indicate to the users 102 that other users 102 are likely to share similar interests, thus allowing the users 102 to contact, and possibly reveal information to, those users 102.

In various embodiments, the system 300 illustrated in FIG. 3 illustrates how the content server 110 may identify similarity between two users 102 and, based on that similarity, makes recommendations 206 to those users 102. Although the content server 110 may monitor location data 202 associated with any number of users 102, FIG. 3 illustrates an example having two users 102, a first user 302 and a second user 304. In these embodiments, the content server 110 may obtain location data 202 that indicates a current or past location of user devices 104 that are associated with the first user 302 and the second user 304. Moreover, and as stated above, there may be a threshold 306 that is to be satisfied before two users 102 are determined to have a sufficient amount of common overlap. That is, before recommendations 206 may be provided to either the first user 302 or the second user 304, a predetermine number of the same locations or events are to be visited by both the first user 302 and the second user 304. Once the threshold 306 is satisfied, meaning that the first user 302 and the second user 304 have visited a threshold 306 number of the same places or events, the first user 302 and the second user 304 may be determined to likely have similar interests.

Furthermore, the location data 202 may indicate specific places, locations, or events (e.g., restaurants, stores, social events, etc.) that the first user 302 and the second user 304 have each visited. As shown in FIG. 3, both the first user 302 and the second user 304 have both visited location 308, location 310, location 312, location 314, and location 316. Here, although the threshold 306 may be any number, the threshold 306 amount of places that the first user 302 and the second user 304 both have to visit before any recommendations 206 are made is five. In addition, it appears that the first user 302 has visited location 318, while the second user 304 has not. Similarly, the content server 110 has determined that the second user 304 has visited location 320, but the location data 202 associated with the first user 302 suggests that the first user 302 has not visited this location (e.g., location 320).

Accordingly, in addition to the same places that both the first user 302 and the second 304 have visited (e.g., locations 308-316), it appears that both the first user 302 and the second user 304 have visited locations that the other user 102 has not. In other words, the first user 302 and the second user 304 have visited at least five of the same places, thus suggesting that they are likely to have interests in common. Therefore, it may be likely that the first user 302 and the second user 304 may be interested in location 318 and location 320, respectively, which have not been visited by those users 102.

Due to the first user 302 and the second user 304 possibly having common interests, the content server 110 may allow the first user 302 and the second user 304 to reveal or share information (e.g., information 322, information 324) about one another. Initially, the first user 302 and the second user 304 may be notified that, based at least in part on the places they have visited or the things they have done, other users 102 may have similar interests. The content server 110 may provide the first user 302 and the second user 304 the opportunity to reveal information to one another. For instance, the first user 302 may reveal information 322 to the second user 304, who may share information 324 with the first user 302. In various embodiments, such information 324 or 326 may include the identity of the user 102 or any other type of information, such as personal information, interests, hobbies, etc. As a result, the content server 110 may allow the first user 302 and the second user 304 to correspond with users 102 that are likely to have common interests, and possibly meet one another. Therefore, the content server 110 provides users 102 the opportunity to meet new people, expand their own networks, and learn about new places and things that are likely to be of interest to those users 102. In other embodiments, the first user 302 and the second user 304 can do this while maintaining their anonymity.

In addition, the content server 110 may provide various recommendations 206 to different users 102. As shown in FIG. 3, the content server 110 may provide a first recommendation 326 to the second user 304 and a second recommendation 328 to the first user 302. In these embodiments, since the location data 202 may indicate that the first user 302 and the second user 304 have visited the same locations (e.g., locations 308-316), it may be inferred that the first user 302 and the second user 304 are likely to have interests in common. Accordingly, the locations that one of the users 102 has visited but the other has not may be of particular interest to the user 102 that has not visited that location.

For example, FIG. 3 illustrates that the first user 302 has visited location 318. However, since the second user 304 has not visited this location 318, the first recommendation 326 that is provided to the second user 304 may identify that location 318. Similarly, the location data 202 may indicate that the second user 304 has visited location 320, but the first user 302 has not. Therefore, the second recommendation 328 that is provided to the first user 302 may identify this location 320. As a result, each of the first user 302 and the second user 304 may receive recommendations (e.g., recommendations 326 and 326) for locations that are likely to be of interest to one another and, thus, may learn about places (e.g., restaurants, stores, nightclubs, museums, services, etc.) or events (e.g., sporting events, social events, etc.) that those users 102 have yet to experience. Moreover, the first recommendation 326 and the second recommendation 328 may be provided to the second user 304 and the first user 302, respectively, while maintaining the anonymity of each user 102. Further, the first recommendation 326 and the second recommendation 328 may or may not reveal the places or events that both the first user 302 and the second user 304 have visited (e.g., locations 308-316). These recommendations may be formed and provided to users 102 based at least in part on the location data 202 that is derived from each of the user devices 104.

Example Processes

Figure 4:
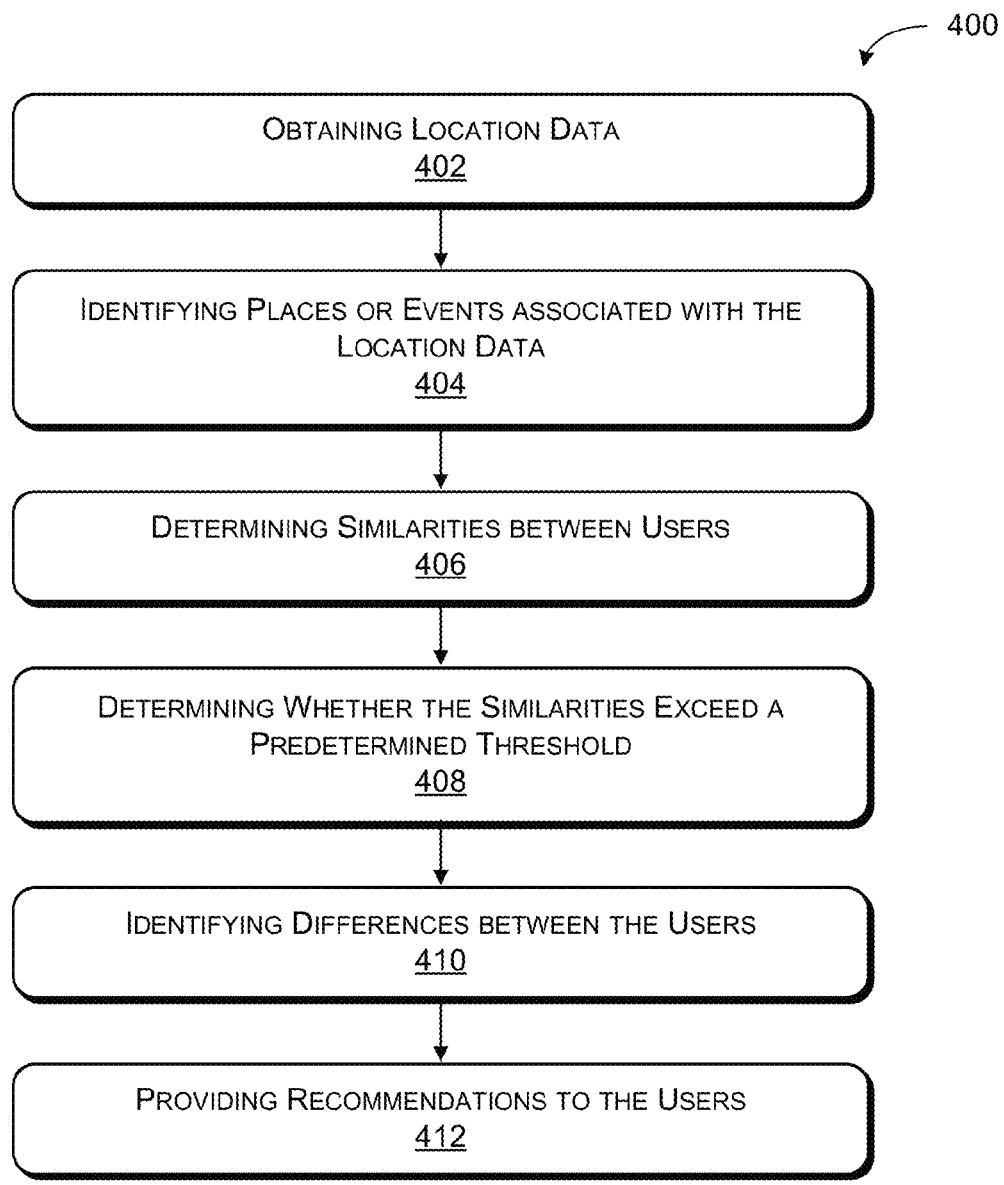
FIG. 4 is a flow diagram showing an example process of providing recommendations to users based at least in part on information or interests that are similar to other users.

FIG. 4 describes various example processes of providing recommendations to users based on location data associated with those users. The example processes are described in the context of the environment of FIGS. 1-3 but are not limited to those environments. The order in which the operations are described in each example method is not intended to be construed as a limitation, and any number of the described blocks can be combined in any order and/or in parallel to implement each method. Moreover, the blocks in FIG. 4 may be operations that can be implemented in hardware, software, or a combination thereof. In the context of software, the blocks represent computer-executable instructions stored in one or more computer-readable storage media that, when executed by one or more processors, cause one or more processors to perform the recited operations. Generally, the computer-executable instructions may include routines, programs, objects, components, data structures, and the like that cause the particular functions to be performed or particular abstract data types to be implemented.

FIG. 4 is a flow diagram illustrating an example process 400 of providing recommendations to users based on location data associated with those users. Moreover, the following actions described with respect to FIG. 4 may be performed by the content server 110, which may be any type of server, a service provider, a merchant 106, etc., as shown in FIGS. 1-3.

Block 402 illustrates obtaining location data. More particularly, the content server (e.g., content server 110) may obtain location data (e.g., location data 202) from user devices (e.g., user devices 104) that are associated with various users (e.g. users 102). More particularly, the location data may be obtained passively, without any actions being performed by the user in addition to carrying a user device. Alternatively, the location data may be provided by a user or may be obtained as a result of the user taking some other action, such as checking into a particular place (e.g., merchant 106). In various embodiments, the location data may be obtained using GPS technology, cell tower triangulation, or in any other manner. Therefore, the location data may indicate a current or past location of a user device, which may indicate the current or past location of the user that is associated with that user device.

Block 404 illustrates identifying places or events associated with the location data. In some embodiments, upon obtaining location data that corresponds to a current or past location of user devices associated with one or more users, the content server may determine where the user was visiting or what the user was doing. For instance, the content server may determine that the user was visiting a restaurant, store, museum, etc., or possibly attending a concert or some other social event. In various embodiments, the content server may maintain a list of places or events, which may be updated over time, that may be compared against the raw location data. As a result, the content server may be able to identify the specific location associated with the location data.

Block 406 illustrates determining similarities between users. More particularly, once it is determined what different users are actually doing, the locations visited by certain users may be compared to one another. That is, the content server may determine that two different users have frequented the same places or events. As a result, since the location data indicates that different users have been to the same places or have done the same things, it may be determined that those users are likely to have common interests. For example, the content server may determine that the users both like a particular type of music or both prefer a certain type of cuisine.

Block 408 illustrates determining whether the similarities exceed a predetermined threshold. In particular, the content server may determine whether at least two different users have been to a certain number of the same places or events, which may be referred to as a threshold, and that may be any number. In certain embodiments, if the number of places or events that the users have both visited meets or exceeds this threshold, the users may be determined to have sufficiently similar interests so that recommendations may be provided to the users.

Block 410 illustrates identifying differences between the users. In various embodiments, in addition to determining similarities between users, the content server may also identify different places that the users visited. For instance, provided that a first user and a second user both visited five different locations, the content server may also identify places that the first user visited, but the second user has not, and vice versa. As a result, since the first user and the second user may have similar interests, the different places that each user visited may be of interest to the other user.

Block 412 illustrates providing recommendations to the users. More particularly, provided that different users are likely have common interests, various recommendations may be provided to the users. In some embodiments, the recommendations may include recommendations for places or events (e.g., restaurants, stores, sporting events, concerts, etc.) that are likely to be of interest to consumers. In other embodiments, the recommendations may indicate to the users that there are other users that are likely to share common interests. For example, the content server may inform users that other users have visited the same places or events as that user. In addition, the content server may provide users the opportunity to communicate or meet other users that are likely to have the same or similar interests. The users may reveal their respective identities or may reveal other information while being able to maintain their anonymity. Accordingly, the content server may make users aware of new people, places and/or events that are likely to be of interest to those users.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as illustrative forms of implementing the claims.

What is claimed is:

1. A method comprising:
under control of one or more processors of a server device:
obtaining location data that corresponds to physical locations of a first user device and a second user device;
identifying places or events that are associated with the physical locations of the first user device and the second user device;
identifying context information that is associated with the places or the events visited by the first user device and the second user device, the context information relating to an action associated with the places or the events;
determining a similarity of the context information for the places or the events that are associated with the first user device and the second user device;
identifying a number of common places or events visited by the first user device and the second user device based at least in part on the similarity of the context information being greater than a predetermined threshold; and
at least partly in response to the determining that the similarity of the context information is greater than the predetermined threshold, indicating that a first user associated with the first user device and a second user associated with the second user device are likely to share common interests.

2. The method as recited in claim 1, further comprising:
informing the first user that the second user is likely to share the common interests with the first user, while preserving an anonymity of the second user; or
informing the second user that the first user is likely to share the common interests with the second user, while preserving an anonymity of the first user.

3. The method as recited in claim 1, further comprising enabling the first user and the second user to reveal a varying degree of information about one another.

4. The method as recited in claim 1, wherein the predetermined threshold indicates whether the first user and the second user share sufficiently similar interests.

5. The method as recited in claim 1, wherein at least partly in response to the indicating, dynamically informing the first user device that the second user device is likely to share common interests with the first user, or dynamically informing the second user device that the first user device is likely to share common interests with the second user based at least in part on a current physical location of the first user device or the second user device.

6. The method as recited in claim 1, further comprising suppressing some, but not all, of the location data that corresponds to the places or the events associated with the first user device or the second user device, based at least in part on the identified context information associated with the first user device or the second user device; and
wherein the number of common places or events is further based on unsuppressed location data that corresponds to the places or the events associated with the first user device and the second user device.

7. One or more non-transitory computer-readable media storing computer-executable instructions that, when executed by one or more processors, cause the one or more processors to perform operations comprising:
obtaining location data that corresponds to current or past physical locations of a plurality of user devices;
determining, based at least in part on the location data, that a first user device of the plurality of user devices has visited one or more first places or first events that have also been visited by other user devices of the plurality of user devices;
identifying context information associated with the one or more first places or first events visited by the first user device and the other user devices, the context information relating to an action associated with visiting the one or more first places or first events;
suppressing the location data that corresponds to less than an entirety of the one or more first places or first events based at least in part on the identified context information;
determining that a number of one or more second places or second events visited by both the first user device and the other user devices meets a threshold, wherein the one or more second places or second events is based on unsuppressed location data that corresponds to the one or more first places or first events;
at least partly in response to the determining, storing an indication that a first user associated with the first user device and other users associated with the other user devices are likely to share common interests; and
based at least partly on the indication, dynamically presenting one or more recommendations to the first user device based at least in part on the current physical location of the first user device or the other user devices.

8. The one or more non-transitory computer-readable media as recited in claim 7, wherein the one or more recommendations include one or more additional places or events visited by the other user devices based at least in part on past physical locations of the other user devices.

9. The one or more non-transitory computer-readable media as recited in claim 7, wherein the operations further comprise identifying one or more additional places or events that were visited by at least some of the other user devices, but not the first user device.

10. The one or more non-transitory computer-readable media as recited in claim 7, wherein the operations further comprise informing the first user that the other users are likely to share interests in common with the first user.

11. A system comprising:
one or more processors;
memory;
one or more modules maintained in the memory and executed on the one or more processors to:
obtain location data that indicates current or past physical locations of a first user device and a second user device;
identify places or events that are associated with the current or past physical locations of the first user device and the second user device;
identify context information that is associated with the places or the events that are associated with the first user device and the second user device, the context information relating to an action associated with the places or the events;
determine a similarity of the context information for the places or the events that are associated with the first user device and the second user device;
identify a number of common places or events visited by the first user device and the second user device based at least in part on the similarity of the context information being greater than a predetermined threshold;

provide one or more recommendations to a first user associated with the first user device, the one or more recommendations to indicate that the first user and a second user that is associated with a second user device are likely to share common interests.

12. The system as recited in claim 11, wherein the places include merchants that are associated with at least one of products, services, places, or events.

13. The system as recited in claim 11, wherein the one or more recommendations include a recommendation for a merchant that is determined to be of interest to the first user.

14. The system as recited in claim 13, wherein the location data indicates that the merchant was visited by the second user device, but not the first user device.

15. The system as recited in claim 11, wherein the one or more modules are further executed on the one or more processors to allow at least one of the first user or the second user to manage privacy settings with respect to the one or more recommendations.

16. The system as recited in claim 15, wherein the privacy settings indicate a degree to which information about the first user and the second user are revealed to one another.

17. The system as recited in claim 11, wherein the location data is obtained passively without any user actuation associated with the first user device and the second user device.

18. The system as recited in claim 11, wherein the one or more modules are further executable by the one or more processors to:

determine at least one of a time of day or a day of a week associated with the location data; and wherein identifying the places or the events that the first user device has visited is further based at least in part on at least one of the time of day or the day of the week.

19. A method comprising:

obtaining location data that corresponds to current or past physical locations of a plurality of user devices;

determining, based at least in part on the location data, that a first user device of the plurality of user devices has visited one or more first places or first events that have also been visited by a second user device of the plurality of user devices;

identifying context information associated with the one or more first places or first events visited by the first user device and the second user device, the context information relating to an action associated with visiting the one or more first places or first events;

suppressing the location data that corresponds to less than an entirety of the one or more first places or first events based at least in part on the context information;

determining that a number of one or more second places or second events visited by the first user device and the second user device meets a threshold, wherein the one or more second places or second events is based on unsuppressed location data that corresponds to the one or more first places or first events;

storing an indication that a first user associated with the first user device and a second user associated with the second user device are likely to share common interests; and based at least partly on the indication, presenting one or more recommendations to the first user device based at least in part on the current physical location of the first user device or the second user device.

20. The method as recited in claim 19, further comprising:

identifying, from the location data, one or more additional places or events that the first user device has visited that the second user device has not; and recommending the one or more additional places or events to the second user device.

21. The method as recited in claim 19, further comprising informing the first user that the second user is likely to share common interests.

22. The method as recited in claim 19, further comprising:

receiving an indication of a user input from the first user device that corresponds to the one or more first places or the first events; and recommending one or more additional places or additional events based at least in part on the user input.

23. The method as recited in claim 19, further comprising:

determining at least one of a time of day or a day of a week associated with the location data; and wherein determining that the first user device has visited one or more first places or first events is further based at least in part on at least one of the time of day or the day of the week.

24. The method as recited in claim 19, wherein determining that the first user device has visited one or more first places or first events is further based at least in part on historical data associated with the first user device.

25. The method as recited in claim 19, further comprising, presenting the one or more recommendations to the second user device, the one or more recommendations including a portion of the one or more second places or second events that were visited by the first user device but not the second user device.

26. The method as recited in claim 25, wherein presenting the one or more recommendations to the second user device occurs while maintaining an anonymity of the first user.

\* \* \* \* \*